United States Patent
Emery

(10) Patent No.: US 8,872,405 B2
(45) Date of Patent: Oct. 28, 2014

(54) HIGH VOLTAGE STATOR COIL WITH REDUCED POWER TIP-UP

(75) Inventor: Franklin T. Emery, Eighty Four, PA (US)

(73) Assignee: Siemens Energy, Inc., Orlando, FL (US)

( * ) Notice: Subject to any disclaimer, the term of this patent is extended or adjusted under 35 U.S.C. 154(b) by 261 days.

(21) Appl. No.: 13/363,524

(22) Filed: Feb. 1, 2012

(65) Prior Publication Data
US 2013/0193796 A1   Aug. 1, 2013

(51) Int. Cl.
*H02K 3/40* (2006.01)

(52) U.S. Cl.
USPC .......................................... 310/196

(58) Field of Classification Search
CPC .................................. H02K 3/04; H02K 3/40
USPC ........................................ 310/214, 215, 196
IPC ....................................................... H02K 3/40
See application file for complete search history.

(56) References Cited

U.S. PATENT DOCUMENTS

| | | | |
|---|---|---|---|
| 5,633,477 A | 5/1997 | Smith et al. | |
| 5,760,516 A * | 6/1998 | Baumann et al. | 310/201 |
| 5,925,944 A | 7/1999 | Emery et al. | |
| 6,228,494 B1 | 5/2001 | Emery | |
| 6,420,812 B1 | 7/2002 | Emery | |
| 6,498,415 B1 | 12/2002 | Emery | |
| 6,559,384 B1 | 5/2003 | Angell et al. | |
| 6,624,547 B1 | 9/2003 | Emery | |
| 6,677,848 B1 | 1/2004 | Emery | |
| 6,724,118 B2 | 4/2004 | Emery | |
| 6,827,805 B2 | 12/2004 | Angell et al. | |
| 6,960,859 B2 * | 11/2005 | Baumann et al. | 310/196 |
| 7,391,141 B2 * | 6/2008 | Emery et al. | 310/213 |
| 7,427,712 B2 | 9/2008 | Emery | |
| 7,705,243 B2 | 4/2010 | Emery et al. | |
| 7,812,260 B2 | 10/2010 | Miller et al. | |
| 8,278,795 B2 * | 10/2012 | Emery | 310/201 |
| 2007/0114052 A1 | 5/2007 | Emery | |
| 2008/0236865 A1 | 10/2008 | Emery et al. | |
| 2011/0062816 A1 | 3/2011 | Emery | |
| 2011/0068643 A1 | 3/2011 | Emery | |

FOREIGN PATENT DOCUMENTS

| | | |
|---|---|---|
| GB | 1800230 A | 10/1981 |
| JP | 53068802 A * | 6/1978 |
| WO | 2009081430 A2 | 7/2009 |

OTHER PUBLICATIONS

Farlex's Dictionary, Definition of the term "cap", Dec. 10, 2013.*
USPTO Translation, Kamiya et al., JP 53068802 A, Jun. 19, 1978.*

* cited by examiner

*Primary Examiner* — Tran Nguyen
*Assistant Examiner* — Thomas Truong

(57) ABSTRACT

An insulated stator coil (16) is provided comprising a plurality of coil strands (18) having a top surface (24) and a bottom surface (26). A filler material (30) is disposed on the top surface (24) and the bottom surface (26) of the plurality of coil strands (18) to smooth discontinuities at the top and bottom surfaces (24, 26). A conductive cap (32, 34) disposed over each of the top and bottom surfaces (24, 26) of the plurality of coil strands (18). A conductive strip (46) is disposed between the filler material (30) and each respective conductive cap (32, 34). The conductive strip (46) is effective to lower a resistivity of the conductive caps (32, 34) such that partial discharges do not occur in the insulated stator coil (16).

14 Claims, 6 Drawing Sheets

HIGH VOLTAGE STATOR COIL WITH REDUCED POWER TIP-UP

FIELD OF THE INVENTION

This invention relates to high-voltage stator coils, and more particularly to methods and apparatuses for inhibiting electrical discharge within stator coils. Although the following discussion focuses on stator coils for turbogenerators, the present invention is applicable to other dynamoelectric machines, including electric motors.

BACKGROUND OF THE INVENTION

Conventional turbogenerators have a rotor and a stator. The rotor is wound with field windings, which are disposed in slots in the body of the rotor. The stator is wound with stator coils, which are disposed in slots in the body of the stator. When the rotor is rotated by an external source of mechanical energy, such as a steam turbine or a gas turbine, and an excitation current is provided to the field windings, electrical energy is induced in the stator coils.

Stator coils are generally constructed from a plurality of individual conductors referred to as strands. The strands are stacked together to form a larger conductor (or coil) capable of carrying high voltages and currents. In many stator coils, the strands are twisted into a weaved pattern rather than simply being stacked one on top of another. This weaving technique is known as Roebelling. Roebelling helps prevent the inner strands of a stator coil, which are closest to the rotor, from carrying more current (and generating more heat) than the outer strands, which are further from the rotor. Roebelling helps ensure that each strand carries a similar amount of current and generates a similar amount of heat.

Roebel fillers are insulating materials used for filling and smoothing the irregular surfaces formed by these Roebeled strands. Roebel fillers generally comprise resin impregnated felt materials or mica splitting, which are bonded to the uneven coil surfaces by a process in which the impregnated materials are simultaneously heated and compressed, causing thermosetting resins to liquefy and fill voids of the irregular coil surfaces, and then to harden. The formed and bonded coil at this stage of manufacture is referred to as a "bakelized coil." Following completion of the bonding stage, a mica tape ground wall is formed around the consolidated coil and vacuum-impregnated with an epoxy resin. The coil is then pressed and baked to a final cure of the insulating structure.

Because the Roebel fillers are processed and cured to the coil surfaces under atmospheric conditions, air bubbles can be entrained in the fillers, forming voids in the hardened epoxy. Voids within the insulation system of high voltage stator coils can be a source of electrical discharges either during electrical testing or during operation of the coil in an electric machine. Electrical discharges or corona activity within a coil's insulation system can be detrimental to the integrity of the insulation and lead to early failure of the coil. In air cooled coils, partial discharges within the high voltage coil can also lead to early failure of the complete stator winding.

Following the manufacture of the high voltage coils, each coil is subject to a series of electrical tests. One test that all coils must pass is the measurement of power factor tip-up. The power factor tip-up test results indicate how well consolidated the coil is, and the effect of the voids within the coil. A high voltage is applied to the coil under test, and the power factor is measured using a power factor bridge. Any internal discharges that occur in the coils cause an increase in the coils' power factor tip-up. The most likely source of partial discharges is unimpregnable, closed voids that are typically trapped bubbles in the epoxy resin associated with the Roebel filler material as mentioned above. Since the coil is bakelized at normal ambient pressure (1 atm), the hardened epoxy resin traps some air. If trapped air in the cured epoxy resin is in the electric field path upon application of the power factor test voltage, then partial discharge activity can occur and cause a high power factor tip-up. The magnitude of power factor tip-up is a function of the level of applied voltage, the size of the void, and its position in the Roebel filler material.

The most effective way to eliminate electrical discharges in the insulating structure of a high voltage stator coil, and reduce power factor tip-up, is to theoretically produce an insulating structure which is void free. Since most voids are formed within the Roebel filler material by trapped air bubbles, one solution would be to process the filler coil in a vacuum. Unfortunately, this approach is typically cost prohibitive due to the expense associated with vacuum/heat impregnation.

BRIEF DESCRIPTION OF THE DRAWINGS

The invention is explained in the following description in view of the drawings that show.

DETAILED DESCRIPTION OF THE INVENTION

Aspects of the present invention aim to provide structures that prevent voids within the Roebel filler material from discharging under the application of voltage. In particular, the present inventors have surprisingly found that the application of a copper conductive strip along a length of a stator coil on a top and bottom conductive cap of each stator coil effectively lowers a resistivity of the conductive caps such that partial discharges do not occur in the stacked coil assembly. In this way, the power factor tip-up associated with the coils of a stacked coil assembly can be substantially improved.

Figure 1:
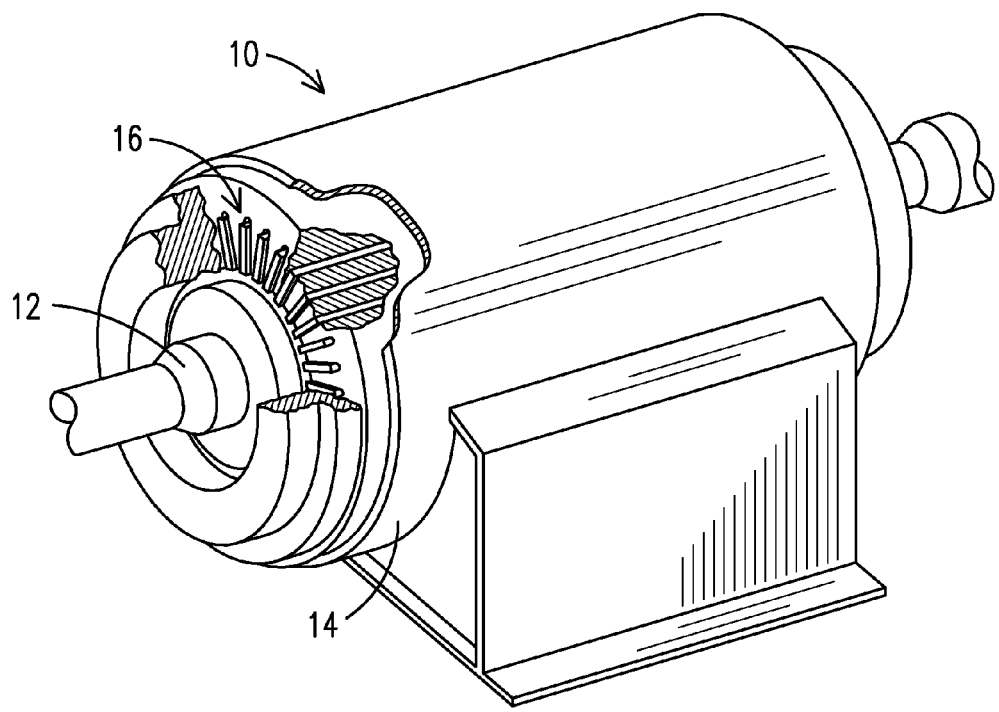
FIG. 1 is a fragmentary perspective view of a typical prior art electromotive machine showing a plurality of stator coils embodying aspects of the present invention.
Figure 2:
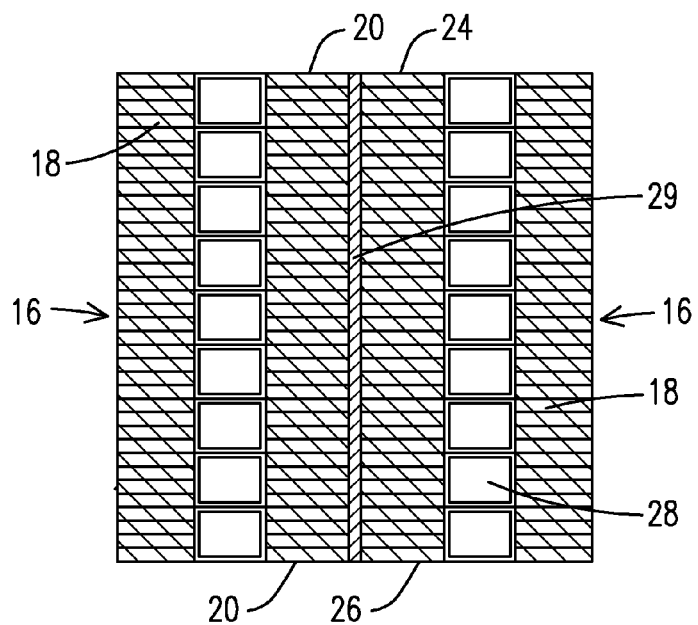
FIG. 2 is a cross-section of a typical prior art coil having a conductive strip in accordance with an aspect of the present invention.

Referring now to the figures, FIG. 1 illustrates an exemplary electromotive machine 10 (e.g., a generator or a motor) that can benefit from aspects of the present invention. Electromotive machine 10 comprises a rotor 12 and a stator 14 positioned to surround the rotor 12, as will be understood by one skilled in the art. The stator 14 includes a plurality of high-voltage (e.g., approximately >4 kV) stator coils 16, illustrated in greater detail in FIG. 2. As shown in FIG. 2, by exemplary stator coil 16, each of the plurality of stator coils 16 includes one or more stacks of coil strands 18, e.g., formed of copper or a copper alloy. Further, each stator coil 16 includes a straight portion 20 (shown in FIG. 2) and an involute portion 22 (shown in FIG. 4). The straight portion 20 is approximately the same length as the stator slot (not shown) for which it is intended. The involute portion 22 is located at each end of the straight portion 20 and facilitates the interconnection of multiple stator coils 16 into a complete generator stator coil.

In one embodiment, the coils strands 18 are Roebeled coil strands that are twisted into a weaved pattern as is known in the art having a top surface 24 and a bottom surface 26. After the stack of strands 18 has been Roebelled, the top and bottom surfaces of the stack are no longer smooth. As such, the top and bottom surfaces 24, 26 will have significant discontinuities caused by the Roebelling of the strands 18. These discontinuities make it difficult to apply an outer layer of insulation, referred to as ground-wall insulation (discussed below). In certain embodiments, as shown in FIG. 2, the stator coil 16 further includes a plurality of metal vent tubes 28, each of which conducts a cooling gas, such as hydrogen or air, there through, although the present invention is not so limited. The vent tubes 28 may be integral with the stator coils 16 to help cool the strands 18. Typically, the vent tubes 28 are stacked on top of one another and sandwiched between two or more stacks of strands 18. Where no vent tubes 28 are positioned between adjacent columns of copper strands, a strand stack separator 29 may be positioned between each of the columns of copper strands 18 to insulate copper strands 18 in each column from the copper strands 18 in each adjacent column.

Figure 3:
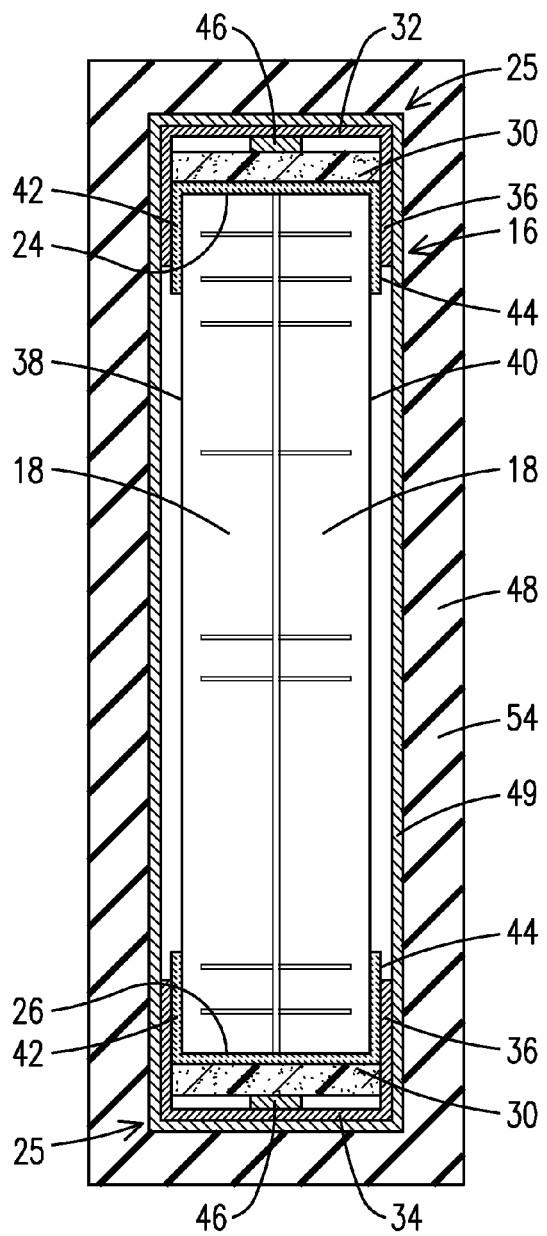
FIG. 3 is another cross-section of another coil having a conductive strip in accordance with an aspect of the present invention.

Referring to FIG. 3, there is shown an insulation assembly 25 for a corresponding stator coil 16 as was shown in FIG. 2, for example. The insulation assembly 25 comprises a layer of filler material 30, which is cured and bonded to each of the top surface 24 and the bottom surface 26 of the coil strands 18 to smooth discontinuities at the top surface 24 and the bottom surface 26. In one embodiment, the filler material 30 comprises a resin-impregnated felt, such as may be made from Nomex® aramid fiber or Dacron® polyester fiber, each available from E.I. Du Pont de Nemours & Co., Inc. The filler material 30 substantially smoothes the top and bottom surface discontinuities that typically result due to the Roebelling (weaving) of the strands. The resin may be any suitable resin or epoxy resin, including modified epoxies, polyesters, polyurethanes, polyimides, polyesterimides, polyetherimides, bismaleimides, silicones, polysiloxanes, polybutadienes, cyanate esters, hydrocarbons, and the like, as well as combinations of these resins.

As is further shown by FIG. 3, the insulation assembly 25 further includes a top conductive cap 32 disposed over the top surface 24 of the strands 18 and a bottom conductor cap 34 disposed over the bottom surface 26 of the coil strands 18. The purpose of the conductive caps 30, 34 are to shield voltage from transferring from the rotor 12 to the filler material 30 where discharges could otherwise result as a result of the presence of voids in the hardened resin of the filler material 30. As explained above, voids within the stator coils 16 can be a source of electrical discharges either during electrical testing or during operation of the coils 16. In one embodiment, each of the caps 32, 34 may include a lateral extension 36 (e.g., having a length ranging from approximately 0.25 inch to approximately 1 inch in one example embodiment) on respective sides 38, 40 of the stack of coil strands 18.

In certain embodiments, as shown in FIG. 3, the insulation assembly 25 may further include a resin-rich mica tape isolation layer 42 between the filler material 30 and the strands 18. In one embodiment, the isolation layer 42 is configured to extend along the width of the coil 16. In certain embodiments, the isolation layer 42 may be further configured to provide a respective lateral extension 44 (e.g., having a length ranging from approximately 0.25 inch to approximately 1 inch in one example embodiment) on each of the sides 38, 40 of the stack of coil strands 18. The present inventor has surprisingly found that the presence of the isolation layer 42 between the coil strands 18 and the filler material 30 helps to insulate the top cap 32 and the bottom cap 34 from the respective surfaces of the coil 16. The presence of the isolation layer 42 further results in an improvement in dielectric performance for the coil 16.

The present inventor has also critically found that the addition of a conductive strip 46 between each cap 32, 34 and the filler material 30 is effective to lower a resistivity of the conductive caps 32, 34 such that partial discharges do not occur in the coil 16. The conductive strip 46 may be constructed of any electrically conductive material, such as copper or any other suitable electrically conductive metal or metal alloy. In one embodiment, one end of the conductive strip 46 is sufficiently long to be electrically connected to at least one of the strands 18 by any suitable affixing technique, such as welding, brazing, soldering, or the application of an adhesive tape, e.g., Nomex® adhesive tape. The opposite end may be electrically floating.

Figure 4:
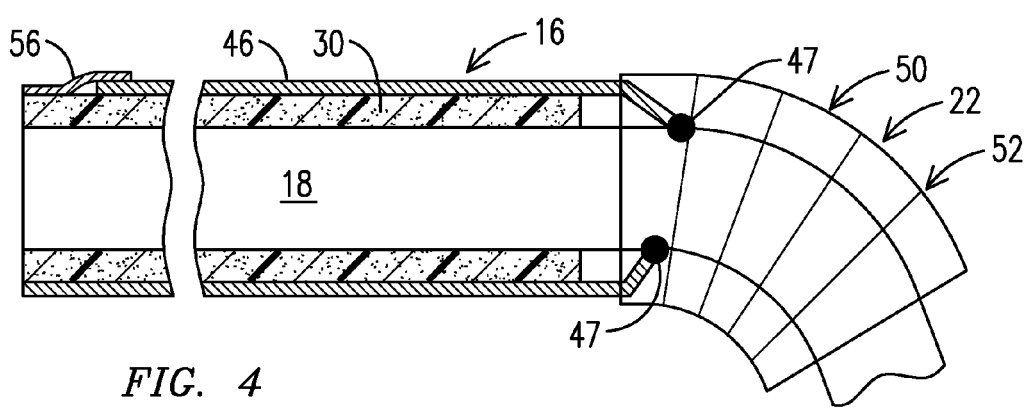
FIG. 4 illustrates the connection of the copper strips over the conductive Roebel filler in accordance with an aspect of the present invention.

As shown in FIG. 4, the conductive strips 46 may be applied on both top and bottom 24, 26 of the strands 18. The free end of the copper strip 46 may be held down with a short length of an adhesive tape 56, such as Nomex® tape. In addition, the opposite end 47 of the conductive strip 46 may be soldered to the coil strands 18 in the involute 22 or cell bend area 50 on the front end 52 of the coil 16.

In one embodiment, the addition of the conductive strip 46 is effective to render an electric potential on the top cap 32 and the bottom cap 34 equal to or substantially equal to an electrical potential on the associated copper strands 18. Further, since the resisitivity of the caps 32, 34 are lowered as a result of the conductive strip 46, the conductive strip 46 is effective to lower a voltage across any voids in the filler material 30 or any other components of the coil 16. The conductive strip 46 may be any suitable width and thickness sufficient to remove an amount of resistance on the conductive caps 32, 34. In one embodiment, for example, the conductive strip 46 extends along a longitudinal length of the coil 16 and typically has a width that is less than a width of the coil 16. In a particular embodiment, the copper strip is from 6-8 mm wide and is from 1-2 mm thickness.

Referring again to FIG. 3, an interface tape 49 was lapped about the top surface 24 and the bottom surface 26 of the coil 16 over the conductive caps 32, 34. The interface tape 49 bonds the tape layers together. The insulation assembly 25 may further comprise a layer of groundwall insulation 48 comprising a mica tape 54 that may be applied over the conductive caps 32, 34 in a suitable lap configuration. The mica tape 54 typically comprises a mica paper layer that is bonded at an interface to a backing layer, such as a glass backing layer. The resin may be any suitable resin or epoxy resin, including modified epoxies, polyesters, polyurethanes, polyimides, polyesterimides, polyetherimides, bismaleimides, silicones, polysiloxanes, polybutadienes, cyanate esters, hydrocarbons etc. as well as homogeneous blends of these resins.

The resin may further include additives such as cross-linking agents, accelerators and other catalysts and processing aids. Certain resins, such as liquid crystal thermosets (LCT) and 1,2 vinyl polybutadiene combine low molecular weights characteristics with good cross-linking properties. Cross-linking agents can also be added to the resins to manipulate the structure and segmental length distribution of the final cross-linked network, which can have a positive effect on thermal conductivity. Optionally, the mica tape and/or impregnating resin may further include high thermal conductivity materials dispersed therein, such as nano, meso, and/or micro-sized inorganic fillers, diamond-like coatings, or nano, meso, and/or micro-sized fillers with diamond like coatings.

The following examples are presented to illustrate aspects of the present invention, but are not intended to be limiting in any respect.

To illustrate the improvement in performance as the result of the addition of the conductive caps 32, 34 and the conductive strip 46 as described above, seven tops and seven bottoms of trial coils were fabricated as follows:

Coil Construction

1. Insulated wire was provided.
2. A center coil stack separator consisting of two pieces of Votafix® with a 0.015 inch thick length of Nomex® felt was sandwiched between the two sheets of Votafix®. The Nomex® was installed to full length of the straight part of the coil. The Votafix® was installed to the end of the crimp on bottom coils and 3.75 inches from the end of the straight part length on the top coils.
3. With the wire, the coil used both flat and butterfly type strand crossover insulators. The material for the crossover insulators was made from Kevlar®.
4. The coil top and bottom cell Roebel filler included two layers: a single conducting layer and a single non-conducting layer. The nonconducting Roebel filler was placed next to the coil surface. The conducting Roebel filler is fabricated from Dacron felt and conductive tape. The non conducting Roebel filler was fabricated from Dacron felt only.
5. The ends of the straight part Roebel filler had a smooth transition to the coil strands at four locations.
6. A copper strip was applied on both the top and bottom of the Roebel filler. The free end of the copper strip terminated at the end of the coil straight part on the rear end of the coil. The free end was held down with a short length of Nomex® tape. The copper strips were held in place on the coil surface, centered in the coil width direction, flat against the coil surface, along its length with Nomex® adhesive-backed tape, placed every 18 inches along the coil length. The free end of the copper strip was taped over with Nomex® tape. The copper strip was disposed under the top and bottom caps and under the single mica tape layer on the cell coil bends. The copper strip end connection (soldered) to the coil was made at the start of the cell bend on the front end of the coil.
7. The copper strip solder connection was made to be well-insulated to prevent a strand to strand short. The solder connection was insulated with 3 wraps of mica tape. The lifted strand was returned to the original position. The free end of the copper strip ended at the end of the coil straight part, just before the coil bends to start the end turn of the coil. The free end was also rounded at the end of the copper strip to reduce the sharpness of the copper strip to prevent cut damage to its surrounding insulation. The end was further covered with a piece of Nomex® adhesive tape.
8. After applying the copper strips and soldering in place on one end, a single half lap layer of mica tape was applied in the cell bend areas from the end of the straight part crimps to the straight part (after the bend) on the coil involute on both coil bends.
9. Non-conductive Roebel filler was used in the involute region. Conductive tape was used over the Roebel filler. An electrical connection was made to the conductive Roebel filler on the coil straight part. The connection was checked with a low voltage ohmmeter.
10. A coil Interface tape was applied in the involute region ending at the start of the hand-applied mica tape in the cell bend. A spaced lap layer was used with a maximum distance between laps of 1 inch. The interface tape was made to lie as flat as possible on the coil surface. A conductive cap, made from conductive felt material, was applied to both the top and bottom of the coil in the coil straight part. Interface tape was used for adhesive tape on the cap.
11. After the conductive cap was placed on the top and the bottom of the coil, hard coil interface tape was applied in the cell region and ended at the start of the hand applied mica tape in cell bend. A spaced lap layer was used with a maximum distance between laps of 1 inch. Interface tape was made to lie as flat as possible on coil surface.
12. Interface tape was not applied to cell bend regions. The groundwall tape was Isovolta 180 gm/meter sq., Poroband 410. The groundwall tape is machine applied. Tape tension was checked for each roll and maintained normal tension.
13. The conductive (groundwall) tape on the outer electrode was a single half lap layer of conductive tape. The end turn voltage grading tape (ecp) is a silicon carbide-loaded semi-conductive voltage grading tape. The coil end turns were taped with Dacron binder. A single half lap layer was applied with a maximum of 1.0 inch with the ecp tape. The binder tape was not applied under the full length of the ecp.
14. A normal preheat at a temperature of 120° C. and VPI cycle were utilized. Within a press, the coils were double stacked. Final cure on all coils was accomplished via hearing to 135° C. for a hold time of 2 hours and 167° for a hold time of 8 hours. Final bake presses were not opened until 50° was reached.

Figure 5:
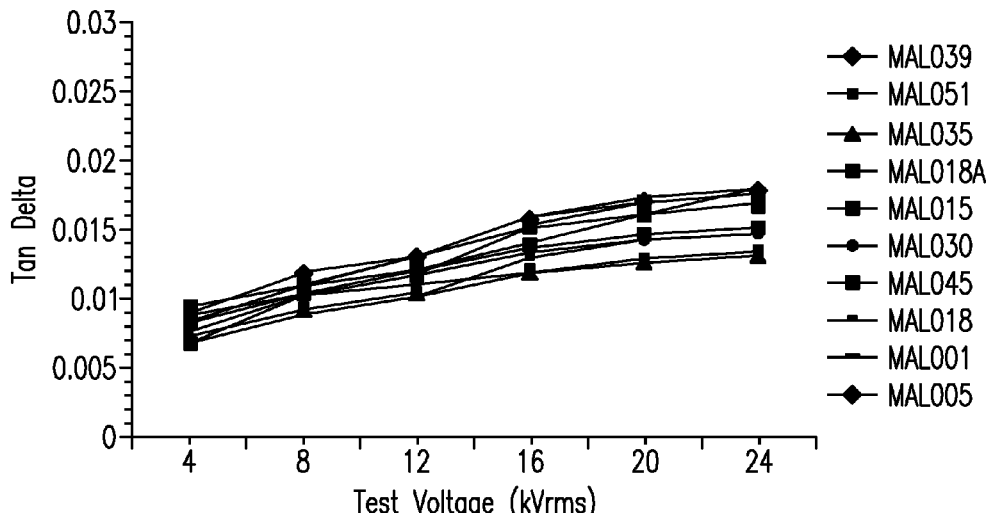
FIG. 5 shows power factor test results for 10 trial coils in accordance with an aspect of the present invention.

Referring to FIG. 5, shown are power factor test results for 10 trial coils. As can be seen, the tested coils (having copper strips) provided similar Tan Delta values for all coils.

Figure 6:
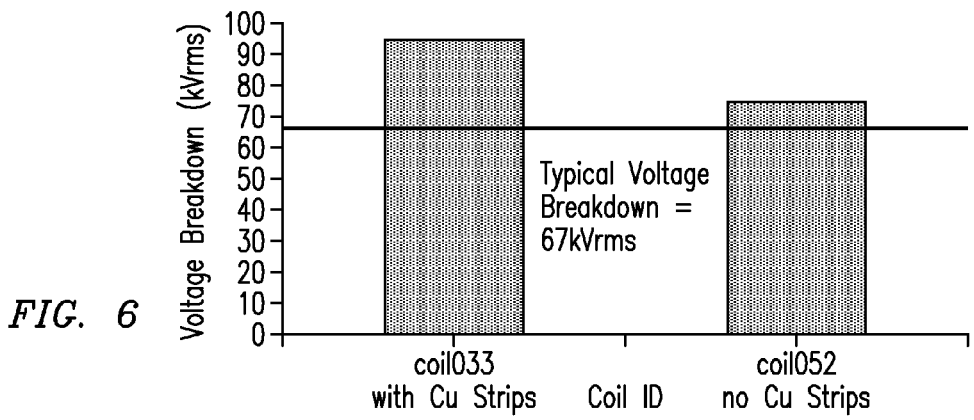
FIG. 6 shows the voltage breakdown for one coil with copper strips and one coil without copper strips in accordance with an aspect of the present invention.

Referring to FIG. 6, two trial coils using the selected coil design, one coil with copper strips and one coil without copper strips, were voltage breakdown tested. The voltage breakdown results for the two coils were very high. Typical voltage breakdown for the coil is on the order of 67 kVrms. The coil with copper strips failed at a location not associated with the copper strips. The coil without the copper strip failed 6 inches from the coil center line in the cell region. Neither voltage breakdown failure occurred in the cell bend regions.

Figure 7:
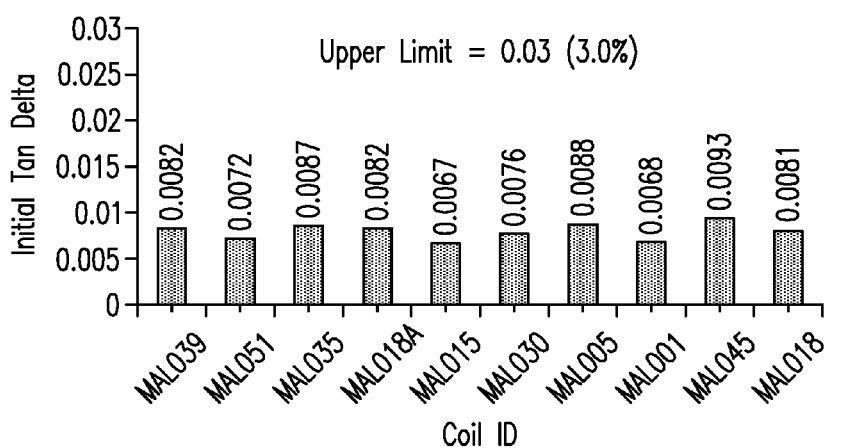
FIG. 7 shows an initial value of Tan Delta well below an upper limit of 0.03 (3%) for trial coils in accordance with another aspect of the present invention.
Figure 8:
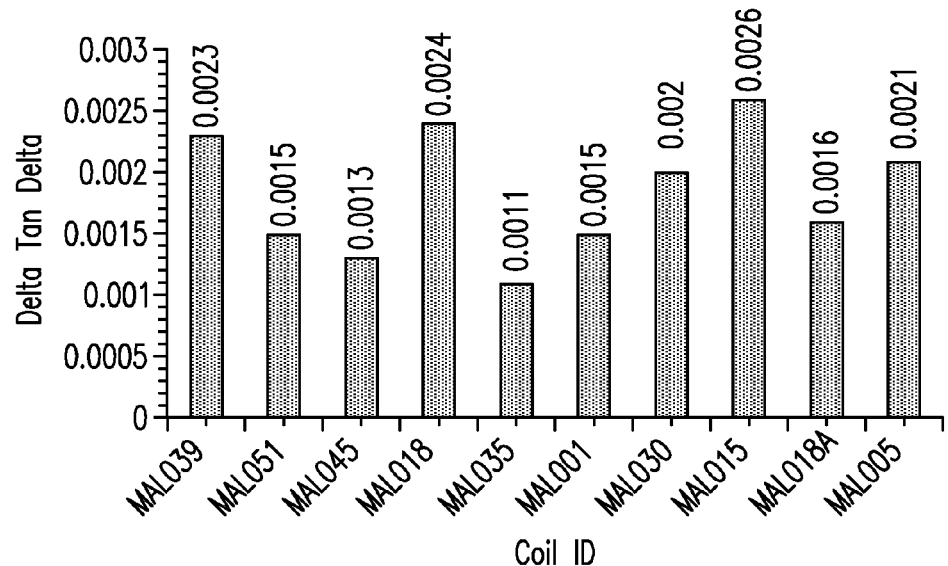
FIG. 8 shows power factor tip-up data for a plurality of coils with an upper limit of 0.25 (0.25%) in accordance with another aspect of the present invention.
Figure 9:
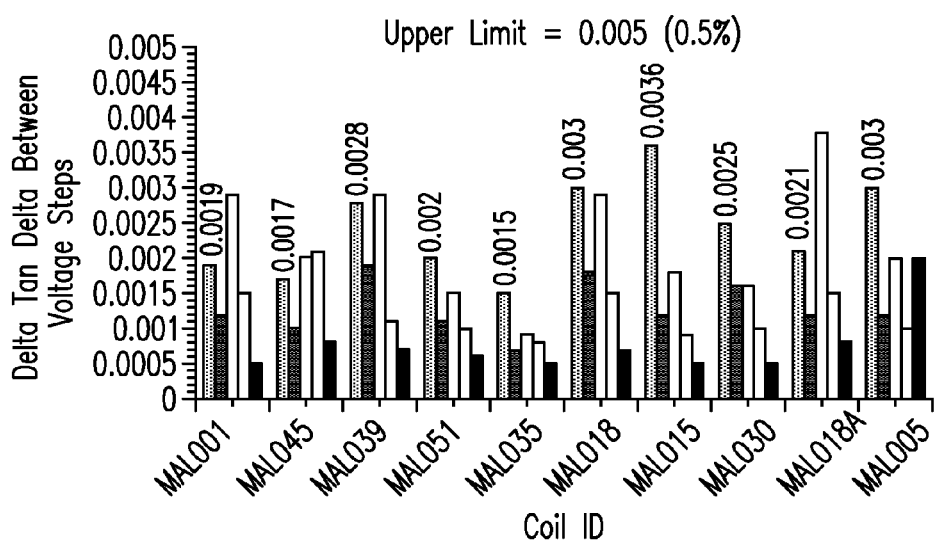
FIG. 9 shows power factor tip-up data for trial coils in accordance with another aspect of the present invention.

Referring to FIG. 7, there are shown initial power factor tip-up factor results for the trial coils. Critically, all initial values of power factor were well below the 0.03 limit. Referring to FIGS. 8-9, there is shown power factor tip-up data for the trial coils with an upper limit of 0.0025 and 0.005 respectively.

Voltage Endurance Test Results on Two Coils

Figure 10:
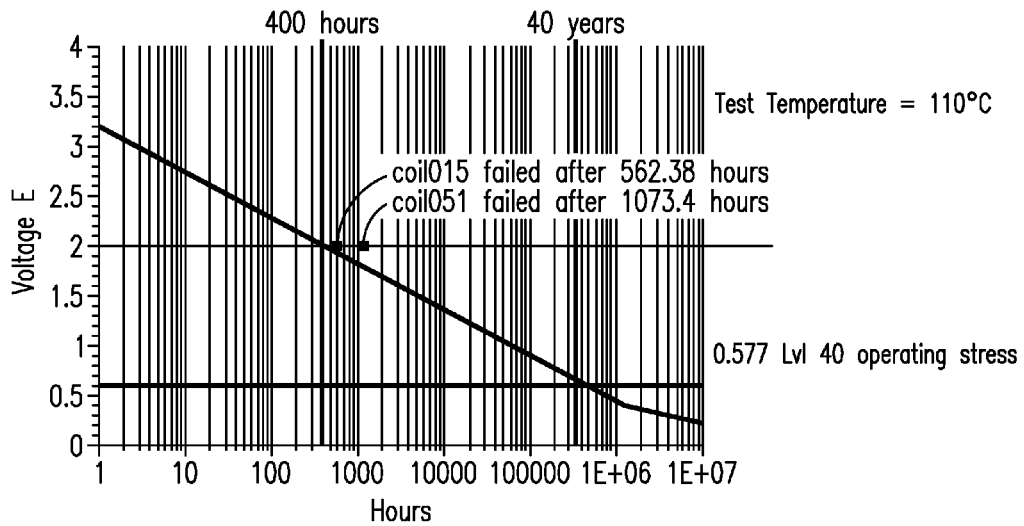
FIG. 10 shows voltage endurance test results on two trial coils, one top and one bottom. Coils were tested at twice rated voltage or 2 E. The coil 015 failed after 562.38 hours and coil 051 failed after 1073.42 hours.

Long term voltage endurance tests were conducted on two coils using a copper strip. The two coils are identified as follows: Coil #15262950-051 T01 and Coil #15253018-015 B02. The two coils, with strap on heater plates the coil sections were heated to 110° C. and placed on voltage test at 40 kV. The resulting VE data is shown plotted in FIG. 10. Both test coils have passed the 2 E voltage endurance requirements of 400 hours. Coil 015 failed after 562.38 hours and coil 051 failed after 1073.42 hours. This translates to a 40 year electrical life at the operating stress level.

Additional Tests on Stator Coils (ECP Resistance Test)

Since the trial coils were cured for a longer time, the ecp resistance was checked to be certain it was not out of range on the high end, because of the longer bake time that the coils were subjected to. One coil was selected for test using a high voltage DC voltage supply and measuring the ecp resistance at both ends of the coil. The coil tested was Coil 15253008-005 B01. The DC resistance of the ecp measured 1927 Megohm/square on the front end and 1455 Megohm/square on the rear end. Both values were acceptable.

ECP AC Voltage Distribution

The AC voltage distribution was measured on both the front and rear end of the coil in order to be able to estimate the voltage between adjacent coils during high potential testing of the completed winding. The coil tested was Coil 15253008-005 B01. Using the data, and the coil side by side ecp profile, the estimated maximum voltage between coils when a test voltage of 1.15(2E+1) kVrms=47.15 kV is applied to the coils, is on the order of 16 kVrms. With 5 S4R3 216 coils in the core model and with the coil ends set per requirements, the vent space between adjacent coils, in the ecp region was measured to be from 0.50" to 0.90" on both ends. With a maximum voltage of 16 kV across the smallest measured gap of 0.50" then no flashover will occur between adjacent coils during the hi-pot test.

Actual test results with 3 coils side by side and with 48 kVrms applied to all three coils, no visible or audible creeping discharges occurred either between the adjacent coils or along the length of the coils. Some corona activity was observed with the Corona Scope at the outboard ends of the ecp. No flashover occurred between adjacent coils. One top and two bottom coils were placed in the model with the top crossing over the bottoms in the ecp regions. The test was repeated at a voltage level of 48 kV. No creeping discharges or flashover occurred between any of the coils. Some corona activity with the Corona Scope was observed at the outboard end of the ecp regions. The side by side and top/bottom coils will pass the high potential test levels required.

Figure 11:
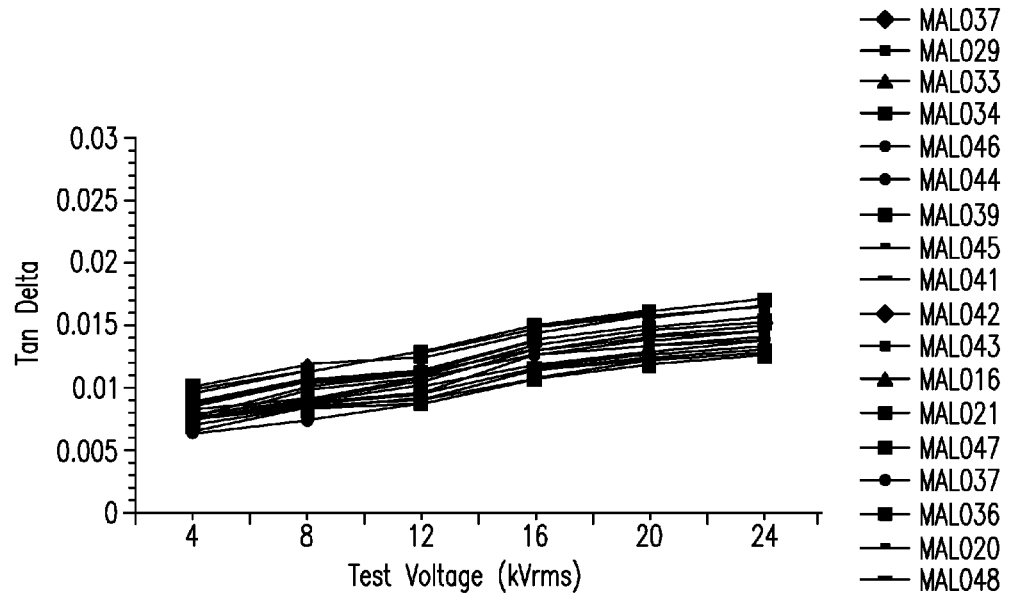
FIG. 11 shows the power production for various trial coils in accordance with an aspect of the present invention.

110 production coils were tested and all coils have passed the ITS474626 power factor requirements. FIG. 11 shows the power factor data plotted for a sample of 19 coils from the 110 coils.

Figure 12:
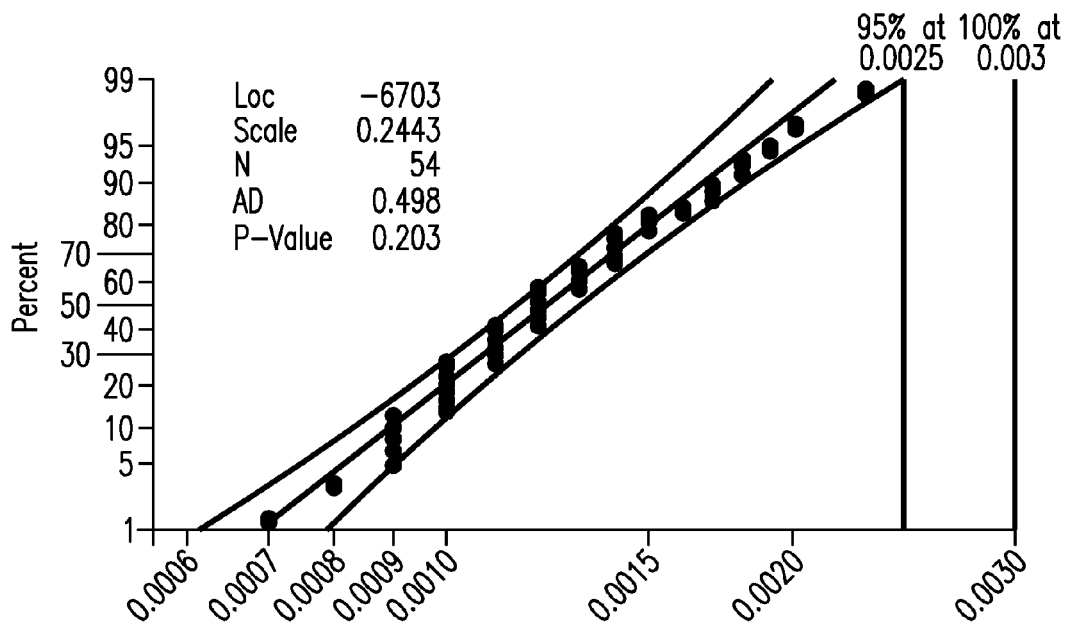
FIG. 12 shows a plot of the normal distribution power factor tip-up results for top coils of trial coils in accordance with an aspect of the present invention.
Figure 13:
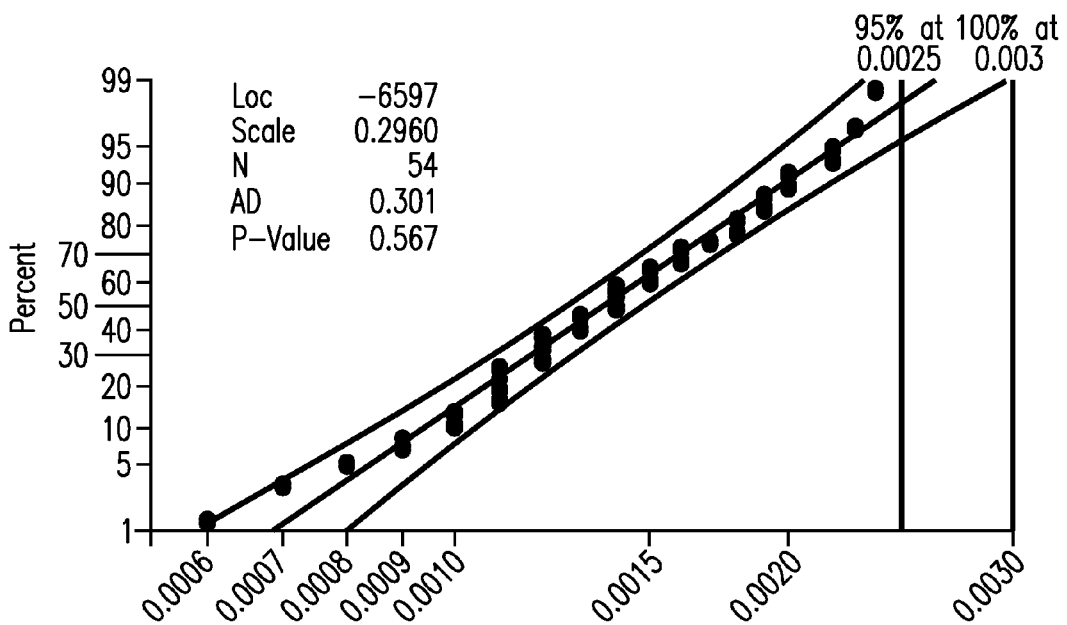
FIG. 13 shows a plot of the normal distribution power factor tip-up results for bottom coils of trial coils in accordance with another aspect of the present invention.

FIGS. 12-13 show the normal distribution of the power factor tip-up for a full set of 108 produced coils. FIG. 12 shows a plot of power factor tip-up results for top coils of the design. All 54 coils passed the requirement as shown. Similarly, FIG. 13 is a plot of power factor tip-up results for bottom coils of the design. All 54 coils sampled passed the requirement as shown.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An insulated stator coil comprising:
 a plurality of coil strands having a top surface and a bottom surface;
 a layer of filler material disposed on the top surface and the bottom surface of the plurality of coil strands to smooth discontinuities at the top and bottom surfaces;
 an isolation layer interposed between a portion of the plurality of coil strands and the layer of filler material;
 a conductive cap disposed over each of the top and bottom surfaces of the plurality of coil strands, wherein the conductive cap includes respective lateral extensions, which define an opening and extend a predefined distance beyond the layer of filler material along respective sides of the coil strands to receive at least a portion of the coil strands, wherein the isolation layer includes respective lateral extensions that extend along a limited portion of the respective sides of the coil strands, the respective lateral extensions of the isolation layer configured to encompass the respective lateral extensions of the conductive cap; and
 a conductive strip disposed between the layer of filler material and each respective conductive cap, the conductive strip arranged to form a circuit connection with the respective conductive caps, the conductive strip effective to lower a resistivity of the conductive caps,
 wherein a first end of the conductive strip is electrically connected to at least one of the plurality of coil strands, and
 wherein, through the circuit connection between the conductive strip and the respective conductive caps, an electric potential of each respective conductive cap is substantially equal to an electric potential of the coil strands, which is effective to reduce occurrence of partial discharges in the insulated stator coil.

2. The insulated stator coil of claim 1, further comprising a groundwall insulation layer surrounding the conductive cap and forming an outer layer on the insulated stator coil.

3. The insulated stator coil of claim 1, wherein the layer of filler material comprises a composite formed from a fiber material impregnated with an epoxy resin binder.

4. The insulated stator coil of claim 1, wherein the conductive strip is formed from copper or an alloy thereof.

5. The insulated stator coil of claim 1, wherein the conductive strip has a width of from 6-8 mm and a thickness of about 1 mm.

6. The insulated stator coil of claim 1, wherein a second end of the conductive strip is electrically open.

7. The insulated stator coil of claim 1, wherein the conductive strip is sized to have width less than a width of the plurality of coil strands.

8. An insulation assembly for a stator coil comprising:
 a layer of filler material disposed on a top surface and a bottom surface of a plurality of coil strands to smooth discontinuities at the top and bottom surfaces;
 an isolation layer interposed between a portion of the plurality of coil strands of the layer of filler material;
 a conductive cap disposed over each of the top and bottom surfaces of the plurality of coil strands, wherein the conductive cap includes respective lateral extensions, which define an opening and extend a predefined distance beyond the layer of filler material along respective sides of the coil strands to receive a portion of the coil strands, wherein the isolation layer includes respective lateral extensions that extend along a limited portion of the respective sides of the coil strands, the respective lateral extensions of the isolation layer configured to encompass the respective lateral extensions of the conductive cap; and a conductive strip disposed between the layer of filler material and each respective conductive cap, the conductive strip arranged to form a circuit connection with the respective conductive caps, the conductive strip effective to lower a resistivity of the conductive caps, wherein a first end of the conductive strip is electrically connected to at least one of the plurality of coil strands, and wherein, through the circuit connection between the conductive strip and the respective conductive caps, an electric potential of each respective conductive cap is substantially equal to an electric potential of the coil strands, which is effective to reduce occurrence of partial discharges in the insulated stator coil.

9. The insulated assembly of claim 8, further comprising a groundwall insulation layer surrounding the conductive cap and forming an outer layer on the insulated stator coil.

10. The insulation assembly of claim 8, wherein the filler material comprises a composite formed from a fiber material impregnated with an epoxy resin binder.

11. The insulation assembly of claim 8, wherein the conductive strip is formed from copper or an alloy thereof.

12. The insulation assembly of claim 8, wherein the conductive strip has a width of from 6-8 mm and a thickness of about 1 mm.

13. The insulation assembly of claim 8, wherein a second end of the conductive strip is electrically open.

14. The insulation assembly of claim 8, wherein the conductive strip is sized to have width less than a width of the plurality of coil strands.

* * * * *